US007003647B2

(12) United States Patent
Jacobs et al.

(10) Patent No.: US 7,003,647 B2
(45) Date of Patent: Feb. 21, 2006

(54) METHOD, APPARATUS AND COMPUTER PROGRAM PRODUCT FOR DYNAMICALLY MINIMIZING TRANSLATION LOOKASIDE BUFFER ENTRIES ACROSS CONTIGUOUS MEMORY

(75) Inventors: Brent William Jacobs, Rochester, MN (US); James Albert Pieterick, Rochester, MN (US)

(73) Assignee: International Business Machines Corporation, Armonk, NY (US)

( * ) Notice: Subject to any disclaimer, the term of this patent is extended or adjusted under 35 U.S.C. 154(b) by 362 days.

(21) Appl. No.: 10/422,662

(22) Filed: Apr. 24, 2003

(65) Prior Publication Data
US 2004/0215918 A1    Oct. 28, 2004

(51) Int. Cl.
*G06F 12/00*    (2006.01)
(52) U.S. Cl. .................. 711/207; 711/202; 711/203; 711/204; 711/205; 711/206; 711/208; 711/209; 711/220; 711/221
(58) Field of Classification Search ........ 711/202–209, 711/220–221
See application file for complete search history.

(56) References Cited
U.S. PATENT DOCUMENTS
6,112,285 A * 8/2000 Ganapathy et al. ......... 711/207

OTHER PUBLICATIONS

Lee et al. "A dynamic TLB management structure to support different page sizes" Aug. 2000, Proceedings of the Second IEEE Asia Pacific Conference, pp 299-302.*
Romer et al. "Reducing TLB and Memory Overhead Using Online Superpage Promotion" May 1995, ACM SIGARCH Compute Architecture News, pp 176-187.*

* cited by examiner

*Primary Examiner*—Donald Sparks
*Assistant Examiner*—Bao Quoc Truong
(74) *Attorney, Agent, or Firm*—Joan Pennington

(57) ABSTRACT

A method, apparatus and computer program product are provided for dynamically minimizing translation lookaside buffer (TLB) entries across contiguous memory. A page table with page table entries (PTEs) is provided for mapping multiple sized pages from a virtual address space to a physical address space. Each of the multiple sized pages is a multiple of a base page size. A region of memory having a starting address and a length is divided into a minimum number of natural blocks for the memory region. Once the region of memory is divided into the natural blocks, page table entries (PTEs) are assigned to map each natural block. Multiple identical PTEs are required to map each natural block greater than a base page size. Only one TLB entry is used to map each natural block.

17 Claims, 15 Drawing Sheets

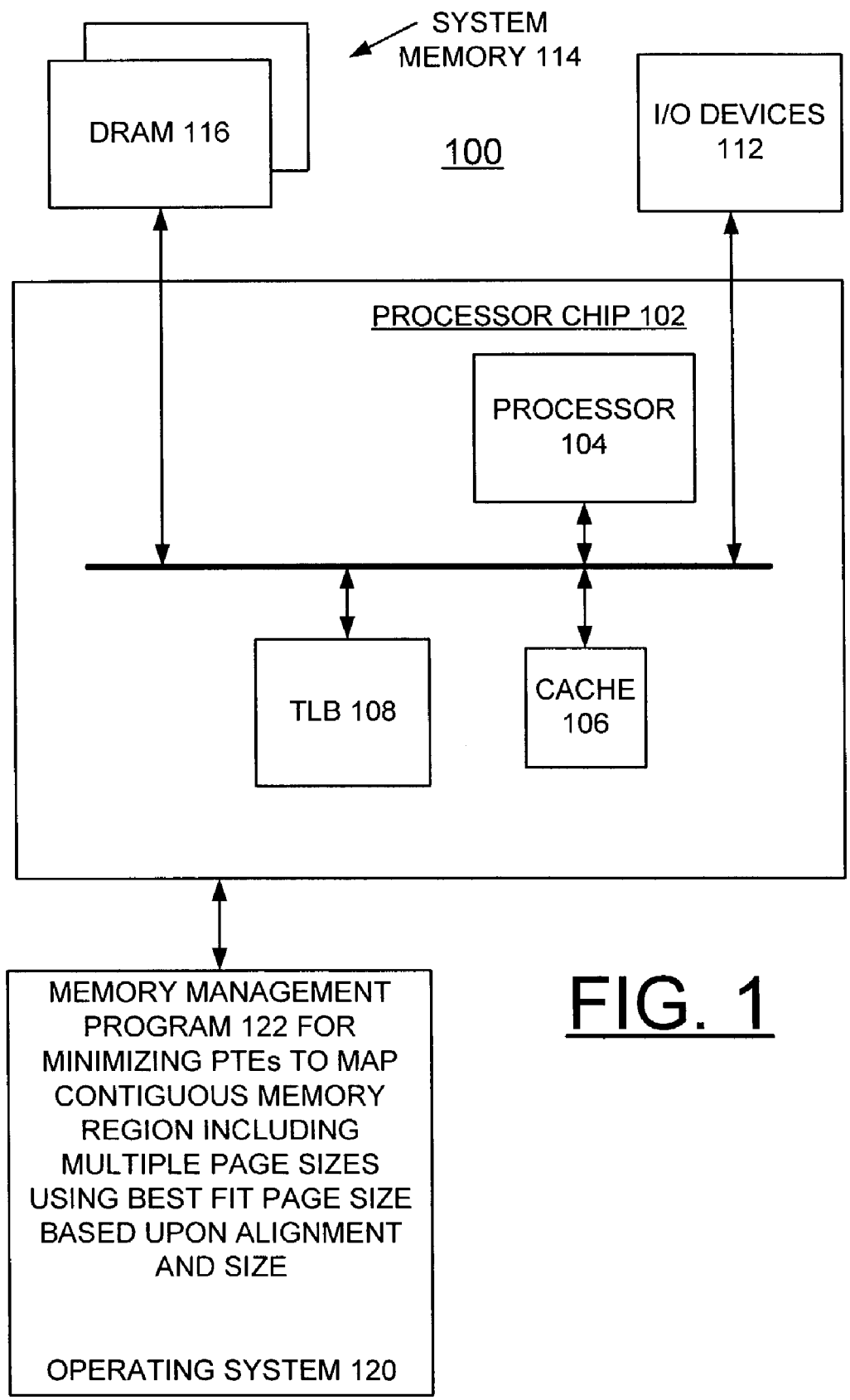

EXEMPLARY PAGE TABLE PORTION SPANNING REGION OF BUFFER
300

| | INITIAL STATE 302 OF PAGE TABLE | | STATE 304 AFTER IDENTIFYING MINIMUM NUMBER OF PTEs | |
|---|---|---|---|---|
| PTE VADDR | PTE PADDR | PTE SIZE | PTE PADDR | PTE SIZE |
| 00040000 | 00040000 | 16K | 00040000 | 16K |
| 00041000 | 00040000 | 16K | 00040000 | 16K |
| 00042000 | 00040000 | 16K | 00040000 | 16K |
| 00043000 | 00040000 | 16K | 00040000 | 16K |
| 00044000 | 00044000 | 16K | 00044000 | 16K |
| 00045000 | 00044000 | 16K | 00044000 | 16K |
| 00046000 | 00044000 | 16K | 00044000 | 16K |
| 00047000 | 00044000 | 16K | 00044000 | 16K |
| PTE_BGN: | | | | |
| 00048000 | 00048000 | 16K | 00048000 | 4K |
| 00049000 | 00048000 | 16K | 00049000 | 4K |
| BUF_BGN: | | | | |
| 0004A000 | 00048000 | 16K | 0004A000 | 4K |
| 0004B000 | 00048000 | 16K | 0004B000 | 4K |
| 0004C000 | 0004C000 | 16K | 0004C000 | 16K |
| 0004D000 | 0004C000 | 16K | 0004C000 | 16K |
| 0004E000 | 0004C000 | 16K | 0004C000 | 16K |
| 0004F000 | 0004C000 | 16K | 0004C000 | 16K |
| 00050000 | 00050000 | 4K | 00050000 | 64K |
| 00051000 | 00051000 | 4K | 00050000 | 64K |
| 00052000 | 00052000 | 4K | 00050000 | 64K |
| 00053000 | 00053000 | 4K | 00050000 | 64K |
| 00054000 | 00054000 | 4K | 00050000 | 64K |
| 00055000 | 00055000 | 4K | 00050000 | 64K |
| 00056000 | 00056000 | 4K | 00050000 | 64K |
| 00057000 | 00057000 | 4K | 00050000 | 64K |
| 00058000 | 00058000 | 4K | 00050000 | 64K |
| 00059000 | 00059000 | 4K | 00050000 | 64K |
| 0005A000 | 0005A000 | 4K | 00050000 | 64K |
| 0005B000 | 0005B000 | 4K | 00050000 | 64K |
| 0005C000 | 0005C000 | 4K | 00050000 | 64K |
| 0005D000 | 0005D000 | 4K | 00050000 | 64K |
| 0005E000 | 0005E000 | 4K | 00050000 | 64K |
| 0005F000 | 0005F000 | 4K | 00050000 | 64K |

FIG. 3A

|  | 300 | | STATE 304 AFTER IDENTIFYING | |
|---|---|---|---|---|
| INITIAL STATE 302 OF PAGE TABLE | | | MINIMUM NUMBER OF PTEs | |
| PTE VADDR | PTE PADDR | PTE SIZE | PTE PADDR | PTE SIZE |
| 00060000 | 00060000 | 64K | 00060000 | 16K |
| 00061000 | 00060000 | 64K | 00060000 | 16K |
| 00062000 | 00060000 | 64K | 00060000 | 16K |
| 00063000 | 00060000 | 64K | 00060000 | 16K |
| 00064000 | 00060000 | 64K | 00064000 | 4K |
| BUF_END: | | | | |
| 00065000 | 00060000 | 64K | 00065000 | 4K |
| 00066000 | 00060000 | 64K | 00066000 | 4K |
| 00067000 | 00060000 | 64K | 00067000 | 4K |
| 00068000 | 00060000 | 64K | 00068000 | 16K |
| 00069000 | 00060000 | 64K | 00068000 | 16K |
| 0006A000 | 00060000 | 64K | 00068000 | 16K |
| 0006B000 | 00060000 | 64K | 00068000 | 16K |
| 0006C000 | 00060000 | 64K | 0006C000 | 16K |
| 0006D000 | 00060000 | 64K | 0006C000 | 16K |
| 0006E000 | 00060000 | 64K | 0006C000 | 16K |
| 0006F000 | 00060000 | 64K | 0006C000 | 16K |
| PTE_END: | | | | |
| 00070000 | 00070000 | 64K | 00070000 | 64K |
| 00071000 | 00070000 | 64K | 00070000 | 64K |
| 00072000 | 00070000 | 64K | 00070000 | 64K |
| 00073000 | 00070000 | 64K | 00070000 | 64K |
| 00074000 | 00070000 | 64K | 00070000 | 64K |
| 00077000 | 00070000 | 64K | 00070000 | 64K |
| 00076000 | 00070000 | 64K | 00070000 | 64K |
| 00077000 | 00070000 | 64K | 00070000 | 64K |
| 00078000 | 00070000 | 64K | 00070000 | 64K |
| 00079000 | 00070000 | 64K | 00070000 | 64K |
| 0007A000 | 00070000 | 64K | 00070000 | 64K |
| 0007B000 | 00070000 | 64K | 00070000 | 64K |
| 0007C000 | 00070000 | 64K | 00070000 | 64K |
| 0007D000 | 00070000 | 64K | 00070000 | 64K |
| 0007E000 | 00070000 | 64K | 00070000 | 64K |
| 0007F000 | 00070000 | 64K | 00070000 | 64K |

FIG. 3B

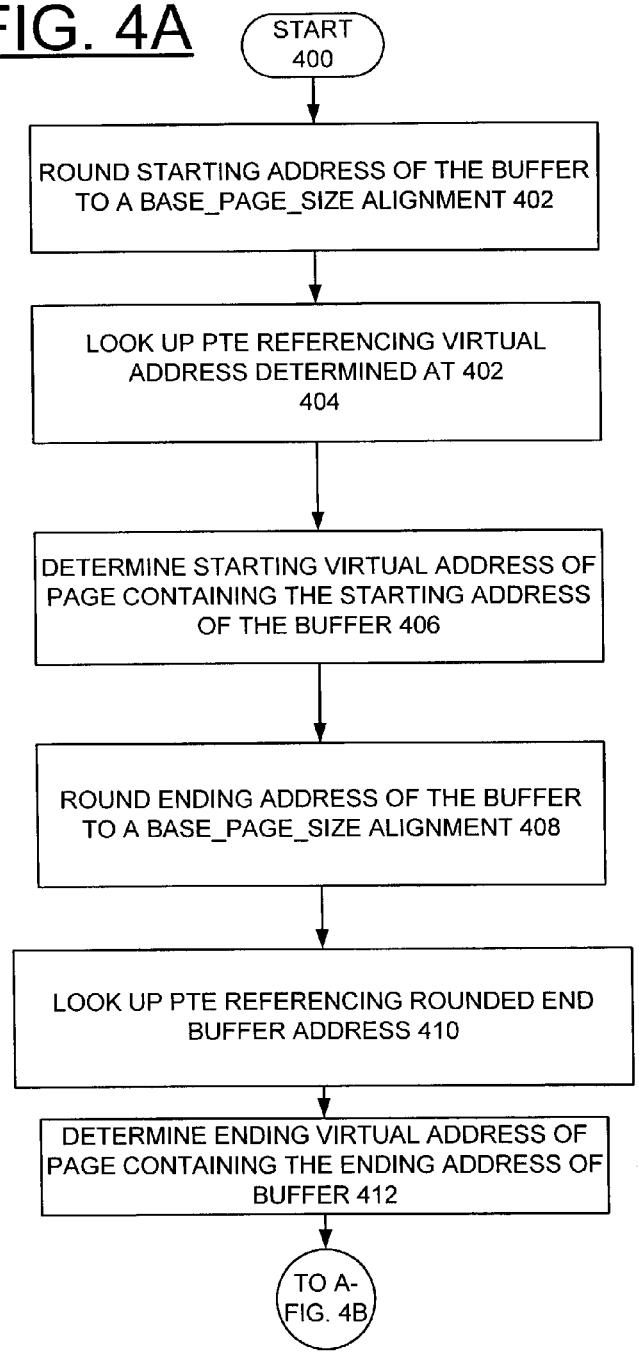

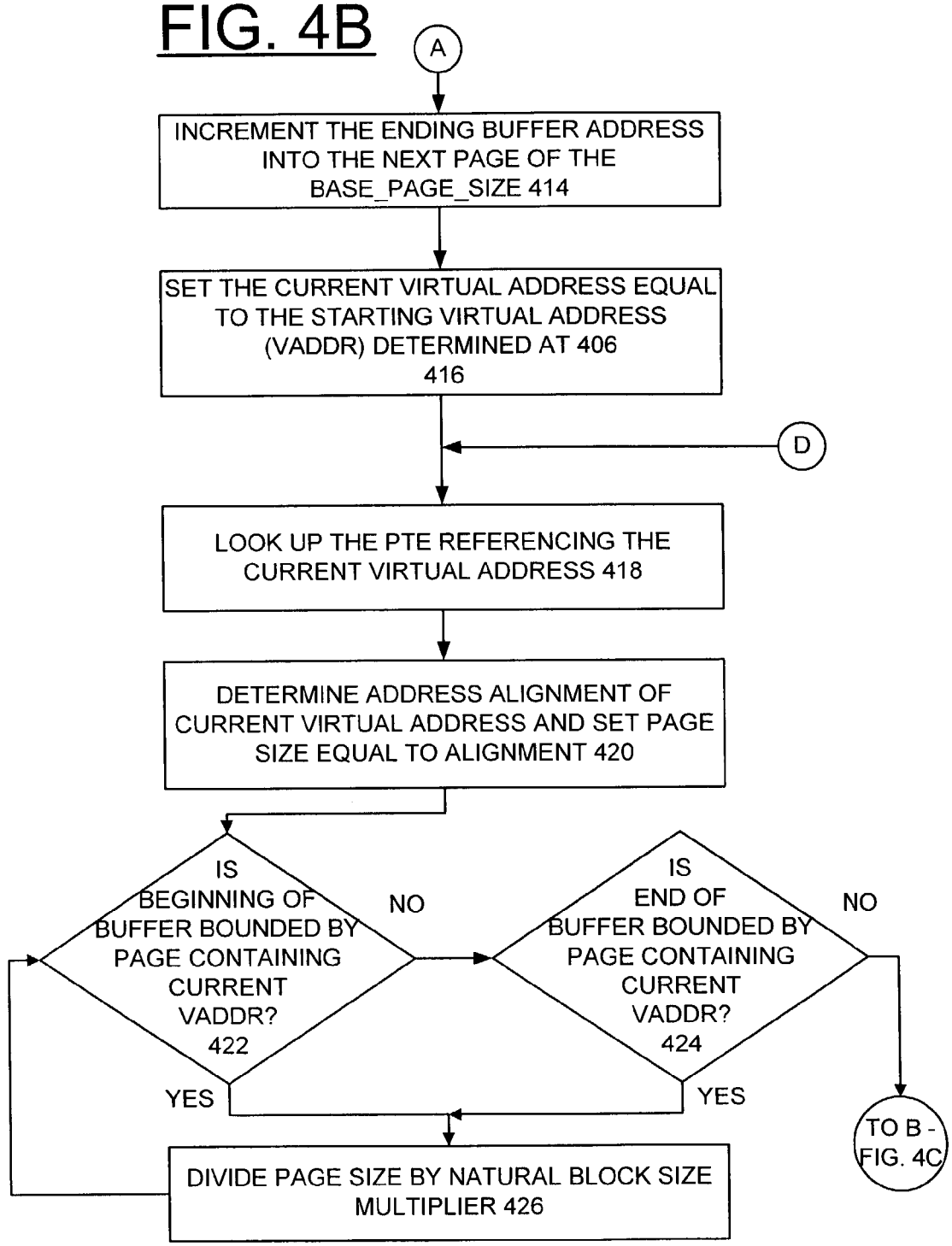

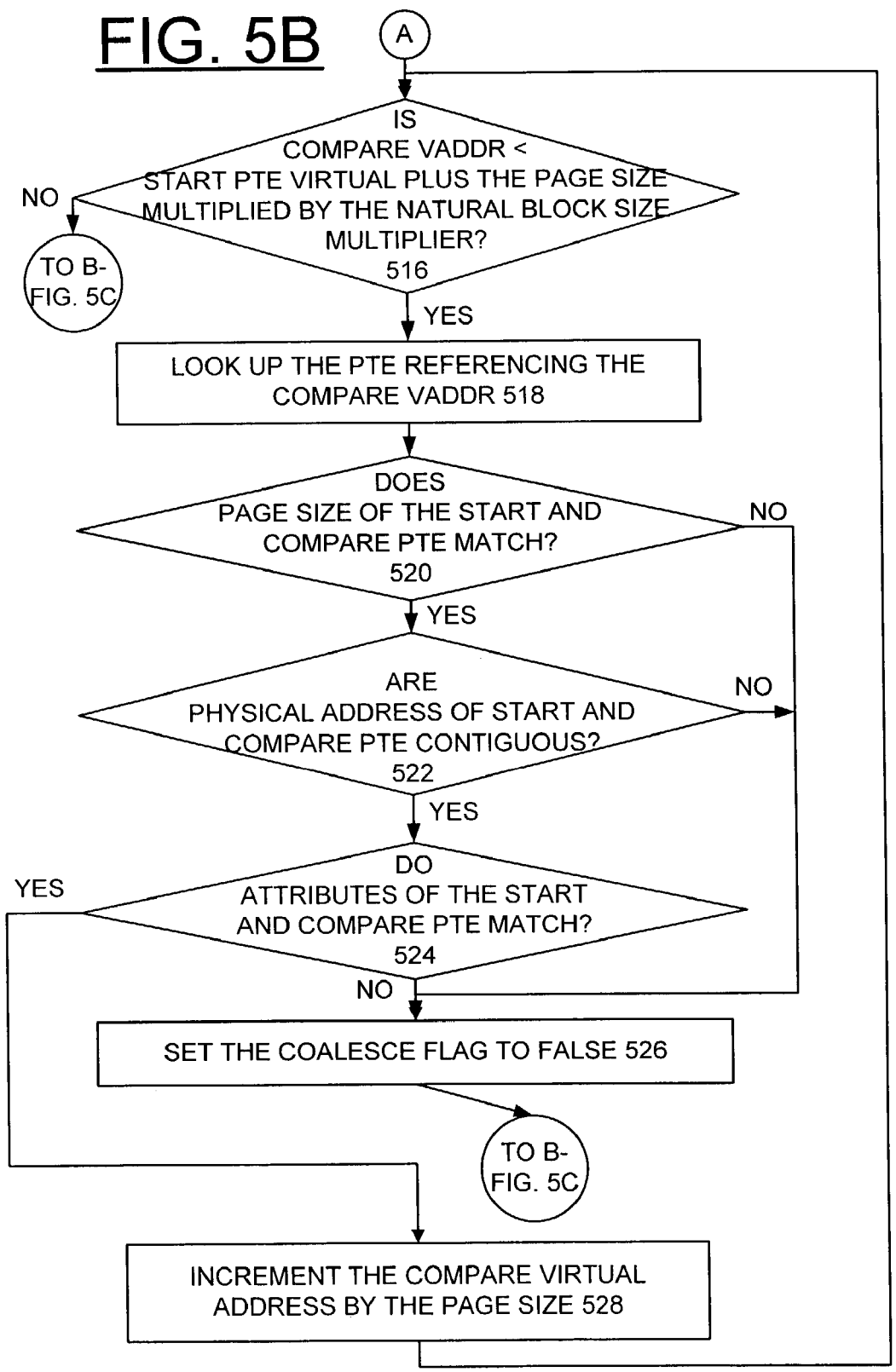

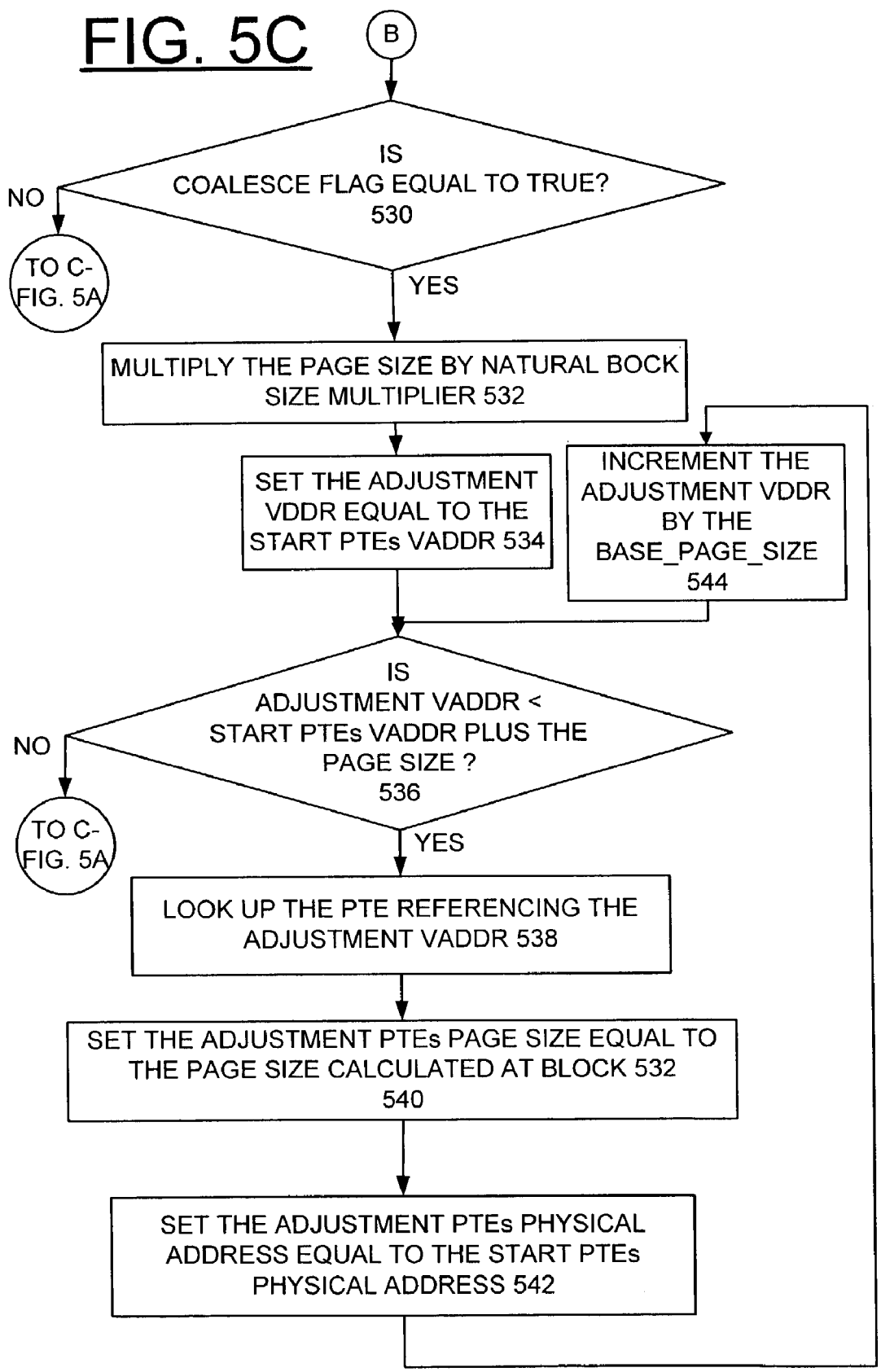

EXEMPLARY PAGE TABLE PORTION
SPANNING REGION OF BUFFER

| INITIAL STATE 602 OF PAGE TABLE | | | | 600 STATE 604 OF PAGE TABLE AFTER COALESCING | | |
|---|---|---|---|---|---|---|
| PTE VDDR | PTE ADDR | PTE SIZE | PTE ATTRs | PTE PADDR | PTE SIZE | PTE ATTRs |
| BUF_BGN: | | | | | | |
| 00040000 | 00040000 | 16K | NWP | 00040000 | 64K | NWP |
| 00041000 | 00040000 | 16K | NWP | 00040000 | 64K | NWP |
| 00042000 | 00040000 | 16K | NWP | 00040000 | 64K | NWP |
| 00043000 | 00040000 | 16K | NWP | 00040000 | 64K | NWP |
| 00044000 | 00044000 | 16K | NWP | 00040000 | 64K | NWP |
| 00045000 | 00044000 | 16K | NWP | 00040000 | 64K | NWP |
| 00046000 | 00044000 | 16K | NWP | 00040000 | 64K | NWP |
| 00047000 | 00044000 | 16K | NWP | 00040000 | 64K | NWP |
| 00048000 PTE: | 00048000 | 4K | NWP | 00040000 | 64K | NWP |
| 00049000 | 00049000 | 4K | NWP | 00040000 | 64K | NWP |
| BUF_END | | | | | | |
| 0004A000 | 0004A000 | 4K | NWP | 00040000 | 64K | NWP |
| 0004B000 | 0004B000 | 4K | NWP | 00040000 | 64K | NWP |
| 0004C000 | 0004C000 | 16K | NWP | 00040000 | 64K | NWP |
| 0004D000 | 0004C000 | 16K | NWP | 00040000 | 64K | NWP |
| 0004E000 | 0004C000 | 16K | NWP | 00040000 | 64K | NWP |
| 0004F000 | 0004C000 | 16K | NWP | 00040000 | 64K | NWP |
| 00050000 | 00050000 | 64K | NWP | 00050000 | 64K | NWP |
| 00051000 | 00050000 | 64K | NWP | 00050000 | 64K | NWP |
| 00052000 | 00050000 | 64K | NWP | 00050000 | 64K | NWP |
| 00053000 | 00050000 | 64K | NWP | 00050000 | 64K | NWP |
| 00054000 | 00050000 | 64K | NWP | 00050000 | 64K | NWP |
| 00055000 | 00050000 | 64K | NWP | 00050000 | 64K | NWP |
| 00056000 | 00050000 | 64K | NWP | 00050000 | 64K | NWP |
| 00057000 | 00050000 | 64K | NWP | 00050000 | 64K | NWP |
| 00058000 | 00050000 | 64K | NWP | 00050000 | 64K | NWP |
| 00059000 | 00050000 | 64K | NWP | 00050000 | 64K | NWP |
| 0005A000 | 00050000 | 64K | NWP | 00050000 | 64K | NWP |
| 0005B000 | 00050000 | 64K | NWP | 00050000 | 64K | NWP |
| 0005C000 | 00050000 | 64K | NWP | 00050000 | 64K | NWP |
| 0005D000 | 00050000 | 64K | NWP | 00050000 | 64K | NWP |
| 0005E000 | 00050000 | 64K | NWP | 00050000 | 64K | NWP |
| 0005F000 | 00050000 | 64K | NWP | 00050000 | 64K | NWP |

FIG. 6A

|  | INITIAL STATE 602 OF PAGE TABLE | 600 | | STATE 604 OF PAGE TABLE AFTER COALESCING | | |
|---|---|---|---|---|---|---|
| PTE VDDR | PTE ADDR | PTE SIZE | PTE ATTRs | PTE PADDR | PTE SIZE | PTE ATTRs |
| 00060000 | 00060000 | 16K | NWP | 00060000 | 16K | NWP |
| 00061000 | 00060000 | 16K | NWP | 00060000 | 16K | NWP |
| 00062000 | 00060000 | 16K | NWP | 00060000 | 16K | NWP |
| 00063000 | 00060000 | 16K | NWP | 00060000 | 16K | NWP |
| 00064000 | 00064000 | 4K | NWP | 00060000 | 4K | NWP |
| 00065000 | 00065000 | 4K | WP | 00060000 | 4K | WP |
| 00066000 | 00066000 | 4K | WP | 00060000 | 4K | WP |
| 00067000 | 00067000 | 4K | WP | 00060000 | 4K | WP |
| 00068000 | 00068000 | 16K | WP | 00060000 | 16K | WP |
| 00069000 | 00068000 | 16K | WP | 00060000 | 16K | WP |
| 0006A000 | 00068000 | 16K | WP | 00060000 | 16K | WP |
| 0006B000 | 00068000 | 16K | WP | 00060000 | 16K | WP |
| 0006C000 | 0006C000 | 16K | WP | 00060000 | 16K | WP |
| 0006D000 | 0006C000 | 16K | WP | 00060000 | 16K | WP |
| 0006E000 | 0006C000 | 16K | WP | 00060000 | 16K | WP |
| 0006F000 | 0006C000 | 16K | WP | 00060000 | 16K | WP |
| 00070000 | 00070000 | 64K | WP | 00070000 | 64K | WP |
| 00071000 | 00070000 | 64K | WP | 00070000 | 64K | WP |
| 00072000 | 00070000 | 64K | WP | 00070000 | 64K | WP |
| 00073000 | 00070000 | 64K | WP | 00070000 | 64K | WP |
| 00074000 | 00070000 | 64K | WP | 00070000 | 64K | WP |
| 00077000 | 00070000 | 64K | WP | 00070000 | 64K | WP |
| 00076000 | 00070000 | 64K | WP | 00070000 | 64K | WP |
| 00077000 | 00070000 | 64K | WP | 00070000 | 64K | WP |
| 00078000 | 00070000 | 64K | WP | 00070000 | 64K | WP |
| 00079000 | 00070000 | 64K | WP | 00070000 | 64K | WP |
| 0007A000 | 00070000 | 64K | WP | 00070000 | 64K | WP |
| 0007B000 | 00070000 | 64K | WP | 00070000 | 64K | WP |
| 0007C000 | 00070000 | 64K | WP | 00070000 | 64K | WP |
| 0007D000 | 00070000 | 64K | WP | 00070000 | 64K | WP |
| 0007E000 | 00070000 | 64K | WP | 00070000 | 64K | WP |
| 0007F000 | 00070000 | 64K | WP | 00070000 | 64K | WP |

FIG. 6B

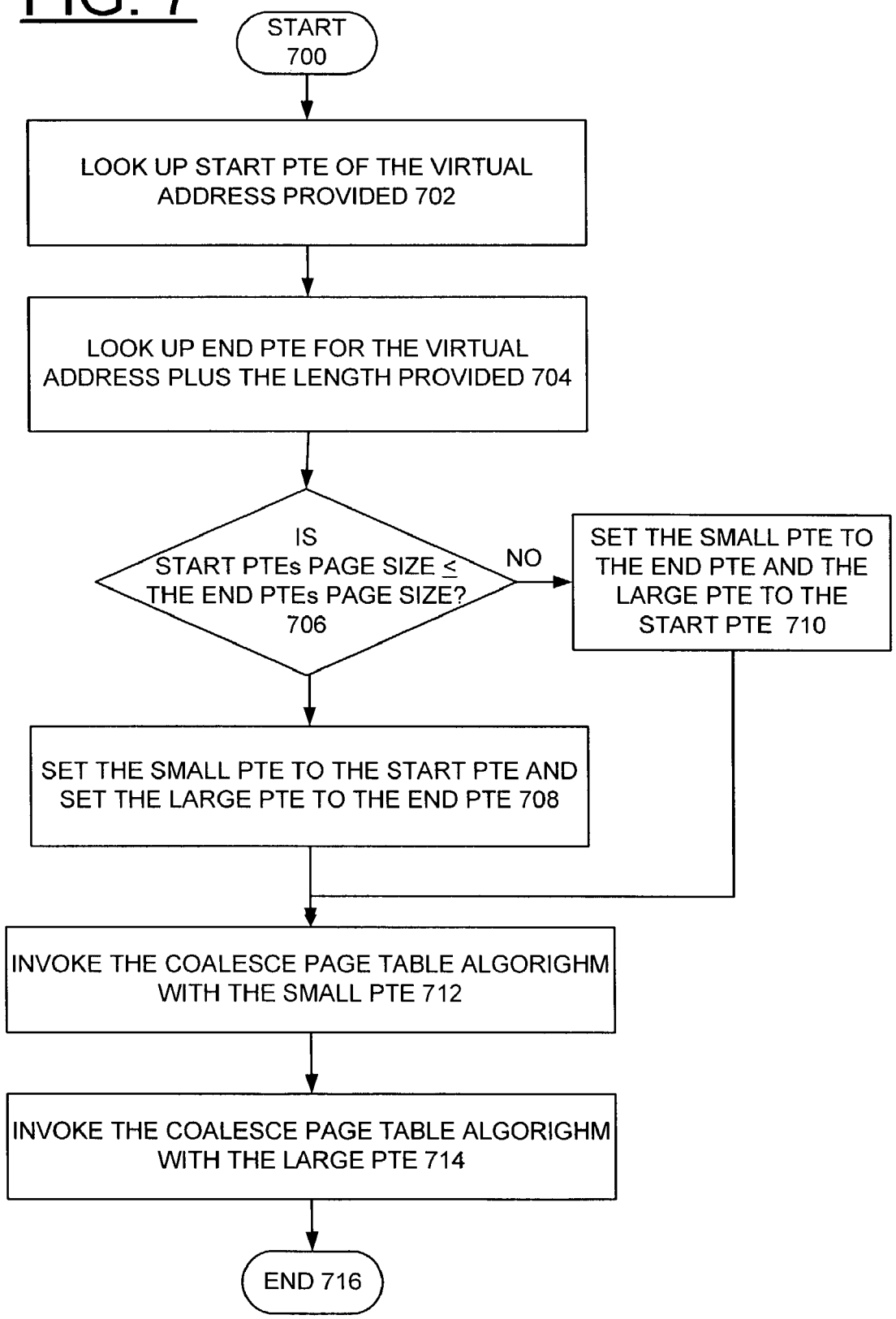

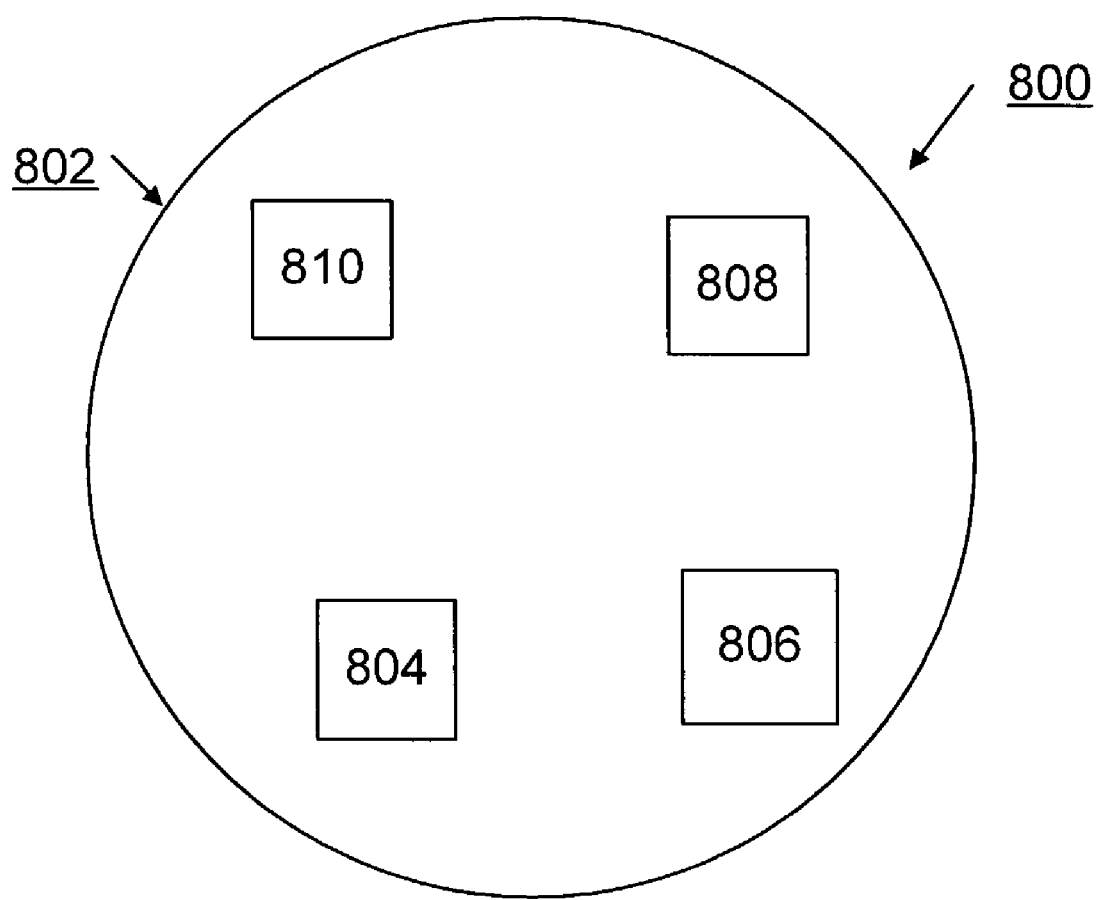

METHOD, APPARATUS AND COMPUTER PROGRAM PRODUCT FOR DYNAMICALLY MINIMIZING TRANSLATION LOOKASIDE BUFFER ENTRIES ACROSS CONTIGUOUS MEMORY

FIELD OF THE INVENTION

The present invention relates generally to the data processing field, and more particularly, relates to a method, apparatus and computer program product for dynamically minimizing translation lookaside buffer (TLB) entries across contiguous memory.

DESCRIPTION OF THE RELATED ART

In order to increase the speed of access to data stored within the main memory, modern data-processing systems generally maintain the most recently used data in the cache memory. The cache memory has multiple cache lines, with several bytes per cache line for storing information in contiguous addresses within the main memory. Data stored in a data cache or memory are stored on cache lines. A typical cache line for example, may be 64 bytes and represented in eight 8×8 byte partial cache lines (i.e., 8 beats of 8 bytes). Each cache line essentially comprises a boundary between blocks of storage that map to a specific area in the cache memory or high-speed buffer. In addition, each cache line has an associated tag that typically identifies a partial address of a corresponding page of the main memory. Because the information within cache may come from different pages of the main memory, the tag provides a convenient way to identify which page of the main memory a cache line belongs.

In a typical cache memory implementation, information is stored in one or several memory arrays. In addition, the corresponding tags for each cache line are stored in a structure known as a directory or tag array. The effective address is translated to a real address according to predefined translation procedures. To minimize address translation time, a specialized cache dedicated to address translation called a translation lookaside buffer (TLB) is used for address translations.

A program references storage using an effective address computed by the processor when it executes a load, store, branch, or cache instruction, and when it fetches the next sequential instruction. Typically, the translation lookaside buffer (TLB) is utilized to facilitate the translation of a virtual address to a real address during a cache memory access. Cache memory access thus involves reading out a line of the cache and its associated tag. The real address from a translation array is then compared with the real address from the tag array. If these real addresses are identical, then the line in the cache that was read out is the desired line, based on the effective or virtual address calculated by the algorithm in use.

In order to access a byte in a cache memory with an effective or virtual address, the line portion (mid-order bits) of the effective or virtual address is utilized to select a cache line from the memory array, along with a corresponding tag from the directory or tag array. The byte portion (low-order bits) of the effective or virtual address is then utilized to choose the indicated byte from the selected cache line. At the same time, the page portion (high-order bits) of the effective address is translated via the segment register or segment lookaside buffer and TLB to determine a real page number. If the real page number obtained by this translation matches the real address tag stored within the directory, then the data read from the selected cache line is the data actually sought by the program. If the real address tag and translated real page number do not agree, a cache miss occurs, meaning that the requested data was not stored in the cache memory. Accordingly, the requested data must be retrieved from the main memory or elsewhere within the memory hierarchy.

Both address translation and cache access involve comparison of a value read from one array with another value read from a different array. In the case of address translation, the virtual segment identifier associated with a given effective address and stored in a segment register or segment lookaside buffer is compared with the virtual address stored as part of an entry in the translation lookaside buffer. Similarly, the translated real page number is compared with the real page number read from the cache tag array to determine whether the accessed line in the cache is the required real page number.

Some microprocessor memory management units (MMU), for example, with one of the PowerPC® line of processors manufactured by International Business Machines Corporation, support the concept of multiple virtual and physical page sizes. The advantage of using multiple size pages is that very large address spaces can be mapped with one page table entry (PTE) and still provide granularity for small pages so as to not waste memory. For example, a 64 KB area could be mapped with one 64 KB PTE or sixteen 4 KB PTEs.

For the processor to use a PTE it must bring the PTE into the translation lookaside buffer (TLB). The number of entries in the TLB is typically limited. For example, only 64 PTEs in the TLB are supported on the Power PC405. Thus, by reducing the number PTEs needed to map an address range, the TLB can map a larger address space without having to make expensive fetches from the page table.

For example, U.S. Pat. No. 6,112,285 issued Aug. 29, 2000 to Ganapathy et al. discloses a method, system and computer program product for virtual memory support for TLBs with multiple page sizes. The disclosed method for determining the page size relies on a uniform page size for covering an entire region of memory. This can result in a large number of PTEs being required to map a region, depending on size and alignment of the region. For example, in the disclosed method when a 1 MB region originally mapped with one 1 MB page has a 16 KB segment that is deallocated, after the deallocation the region is mapped with sixty four 16 KB pages.

A need exists for a method, apparatus and computer program product for dynamically minimizing translation lookaside buffer (TLB) entries across contiguous memory. It is desirable to provide such method, apparatus and computer program product for dynamically minimizing translation lookaside buffer (TLB) entries across contiguous memory that is simple to implement and that optimizes computer system performance.

SUMMARY OF THE INVENTION

A principal object of the present invention is to provide a method, apparatus and computer program product for dynamically minimizing translation lookaside buffer (TLB) entries across contiguous memory. Other important objects of the present invention are to provide such method, apparatus and computer program product for dynamically minimizing translation lookaside buffer (TLB) entries across contiguous memory substantially without negative effect and that overcome some of the disadvantages of prior art arrangements.

In brief, a method, apparatus and computer program product are provided for dynamically minimizing translation lookaside buffer (TLB) entries across contiguous memory. A page table with page table entries (PTEs) is provided for mapping multiple sized pages from a virtual address space to a physical address space. Each of the multiple sized pages is a multiple of a base page size. A region of memory having a starting address and a length is divided into a minimum number of natural blocks for the memory region. Once the region of memory is divided into the natural blocks, PTEs are assigned to map each natural block. Multiple identical PTEs are required to map each natural block greater than a base page size. Only one TLB entry is used to map each natural block.

BRIEF DESCRIPTION OF THE DRAWINGS

The present invention together with the above and other objects and advantages may best be understood from the following detailed description of the preferred embodiments of the invention illustrated in the drawings, wherein:

FIG. 1 is a block diagram representation illustrating a processor system for implementing methods for dynamically minimizing translation lookaside buffer entries across contiguous memory in accordance with the preferred embodiment;

FIGS. 3A and 3B together provide a diagram illustrating a portion of a page table that spans a region of a buffer including an initial state of the page table and a state after identifying a minimum number of page table entries in accordance with the preferred embodiment;

FIGS. 4A, 4B, 4C, and 4D together provide a flow diagram illustrating exemplary steps for parsing a page table for a virtual address and length in accordance with the preferred embodiment;

FIGS. 5A, 5B, and 5C together provide a flow diagram illustrating exemplary steps for coalescing page table entries in accordance with the preferred embodiment;

FIGS. 6A and 6B together provide a diagram illustrating a portion of a page table that spans a region of a buffer including an initial state of the page table and a state after coalescing page table entries in accordance with the preferred embodiment;

FIG. 7 is a flow diagram illustrating exemplary steps of a select order algorithm in accordance with the preferred embodiment; and FIG. 8 is a block diagram illustrating a computer program product in accordance with the preferred embodiment.

DETAILED DESCRIPTION OF THE PREFERRED EMBODIMENTS

Figure 2A:
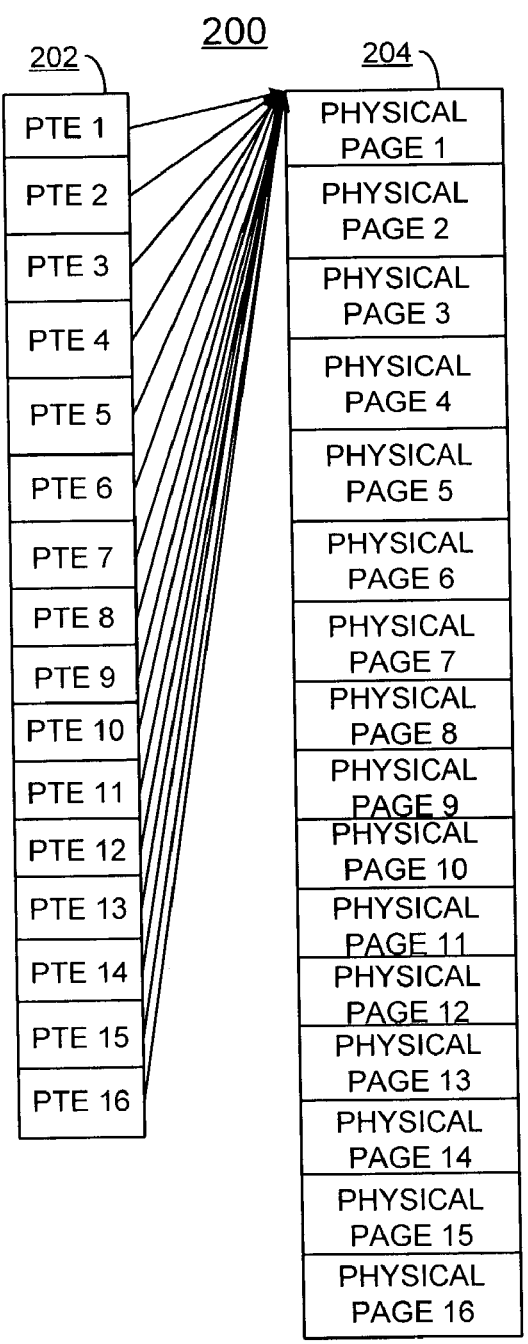
FIGS. 2A and 2B are diagrams respectively illustrating examples of splitting a large page into smaller pages in accordance with the preferred embodiment.

Having reference now to the drawings, in FIG. 1, there is shown a processor system generally designated by the reference character 100 for carrying out methods for dynamically minimizing translation lookaside buffer entries across contiguous memory of the preferred embodiment. As shown in FIG. 1, processor system 100 includes a processor chip generally designated by the reference character 102. Processor chip 102 includes a processor 104, a cache 106 and a translation lookaside buffer (TLB) 108. Processor system 100 includes input/output (I/O) devices 112, and a system memory 114 including a dynamic random access memory (DRAM) 116. Processor system 100 includes an operating system 120 and a memory management program 122 for minimizing PTEs to map contiguous memory region including multiple page sizes using a best fit page size based upon alignment and size of the preferred embodiment.

Processor system 100 is shown in simplified form sufficient for understanding the invention. It should be understood that the present invention is not limited to use with the illustrated processor system 100.

Processor 102 can be implemented with various standard processors, for example, with one of the PowerPC® line of processors manufactured by International Business Machines Corporation.

In accordance with features of the preferred embodiment, a method is provided for minimizing the number of page table entries (PTEs) required to map a contiguous region of memory. The method of the preferred embodiment minimizes the number of page table entries (PTES) required to map a contiguous memory region by using a best fit page size based on alignment and size. Multiple page sizes advantageously are used to cover a contiguous memory region and the region is divided into smaller segments based upon alignment and size. For example, consider a 1 MB region originally mapped with one 1 MB page having a 16 KB segment that is deallocated. After the deallocation, the 1 MB region is divided into four 256 KB segments, three of the four 256 KB segments are mapped with three 256 KB PTEs. The 256 KB segment containing the 16 KB page that was deallocated is further divided into four 64 KB segments, three of the four 64 KB segments are mapped with three 64 KB PTEs. The 64 KB segment containing the 16 KB page that was deallocated is mapped with four 16 KB PTEs. Thus, to map the 1 MB region in accordance with the preferred embodiment only 10 PTEs are required after the deallocation. A method also is provided for coalescing smaller PTEs back into a large PTE.

A PTE size and alignment restrictions are defined by the hardware characteristics of a memory control unit of a microprocessor. For example, the PowerPC405 defines PTE sizes and their respective alignments to be 1K, 4K, 16K, 64K, 256K, 1M, 4M, and 16M. A natural block is a block of memory that is aligned on a PTE size boundary or greater and spans the length of the PTE size. That is, a block of memory that is:

aligned on a 1K boundary and spans 1K is a 1K natural block;

aligned on a 4K boundary and spans 4K is a 4K natural block;

aligned on a 16K boundary and spans 16K is a 16K natural block;

aligned on a 64K boundary and spans 64K is a 64K natural block;

aligned on a 256K boundary and spans 256K us a 256K natural block;

aligned on a 1M boundary and spans 1M is a 1M natural block;

aligned on a 4M boundary and spans 4M is a 4M natural block; and aligned on a 16M boundary and spans 16M is a 16M natural block.

A natural block maps one or more pages of the base size, all base size pages within the natural block have the same characteristics, for example write protection, and cacheability. In addition, the natural block maps a set of contiguous physical pages of the base size. The base page size is the smallest page size used. For example, in the preferred embodiment, 4 KB is the smallest page size used, even though the PowerPC supports a 1 KB page size.

In accordance with features of the preferred embodiment, the method performs as follows: For any given region of memory, any starting address and any block length, the region of memory is subdivided into the minimum number of the largest size natural blocks that make up that region of memory. Once the region of memory is subdivided into its natural block constituents, PTEs are assigned to map each natural block. Multiple identical PTEs will be required to map natural blocks greater than the base size. Only one TLB entry is needed to map the entire natural block. By assigning the largest PTE page size or sizes for a region of memory, more memory is mapped by the TLB at any given time, minimizing TLB misses and maximizing TLB hits, thereby significantly increasing system performance. For example, a 40+% improvement in system throughput has been measured using a direct access storage device (DASD) IOA using the TLB entry minimizing method of the preferred embodiment.

For example, a region of memory with a starting address of 0x1000 and a length of 0xDE000 would be subdivided into the following natural blocks using the discrete PTE sizes of the PPC405 from above.

0x0000_1000 length 0x1000 PTE size 0x1000
0x0000_2000 length 0x1000 PTE size 0x1000
0x0000_3000 length 0x1000 PTE size 0x1000
0x0000_4000 length 0x4000 PTE size 0x4000
0x0000_8000 length 0x4000 PTE size 0x4000
0x0000_C000 length 0x4000 PTE size 0x4000
0x0001_0000 length 0x10000 PTE size 0x10000
0x0002_0000 length 0x10000 PTE size 0x10000
0x0003_0000 length 0x10000 PTE size 0x10000
0x0004_0000 length 0x40000 PTE size 0x40000
0x0008_0000 length 0x40000 PTE size 0x40000
0x000C_0000 length 0x10000 PTE size 0x10000
0x000D_0000 length 0x4000 PTE size 0x4000
0x000D_4000 length 0x4000 PTE size 0x4000
0x000D_8000 length 0x4000 PTE size 0x4000
0x000D_C000 length 0x1000 PTE size 0x1000
0x000D_D000 length 0x1000 PTE size 0x1000
0x000D_E000 length 0x1000 PTE size 0x1000

In accordance with features of the preferred embodiment, each natural block with a size greater than the base page size is made up of a number of PTEs equal to a number required to map the entire natural block at the base page size. This is done to allow the natural blocks to grow and shrink without changing the structure of the page table. In accordance with features of the preferred embodiment, neighboring natural blocks can be coalesced back together if the natural blocks share the same characteristics, for example, write protection, cacheability, map physically contiguous pages, and meet the alignment and size requirements described above.

Figure 2B:
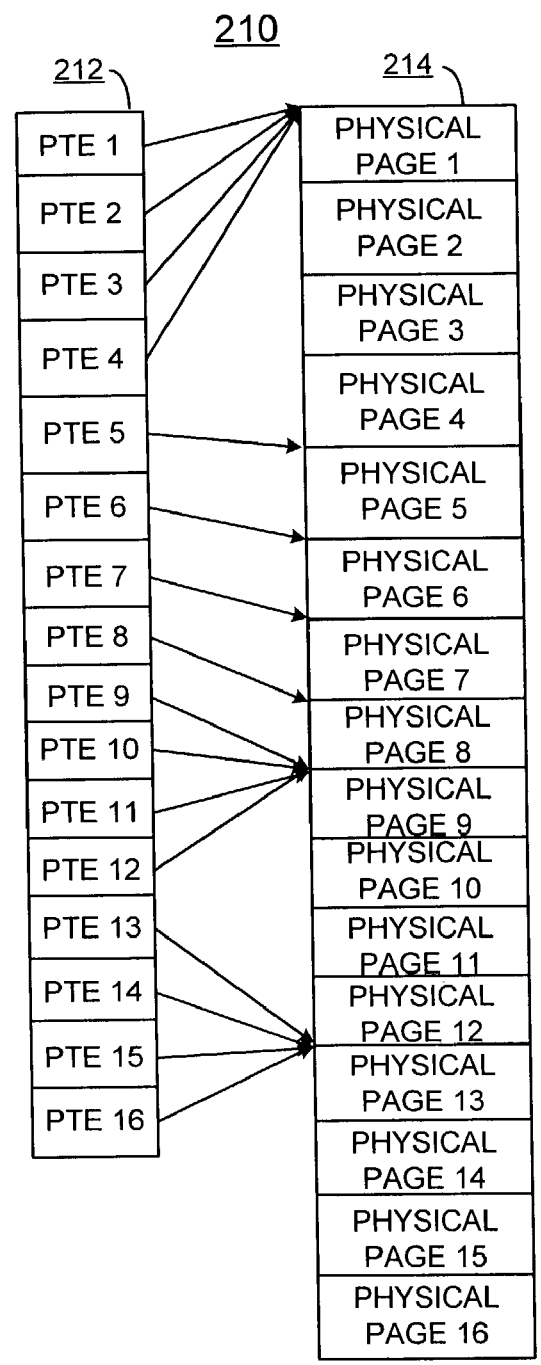

Referring now FIGS. 2A and 2B, there are shown examples of splitting a large page into smaller pages in accordance with the preferred embodiment. FIGS. 2A and 2B show how multiple Page Table Entries (PTEs), which are based on the smallest page size, are used to map a larger page size.

In FIG. 2A, the illustrated example generally designated by the reference character 200 includes a plurality of page table entries (PTEs) 1–16, 202 and a plurality of physical pages 1–16, 204. Each of the page table entries 1–16, 202 maps a length equal to sixteen physical pages 204. The example 200 of FIG. 2A requires only one of the PTEs to be loaded into the TLB to map all 16 physical pages, this is due to the fact that all 16 PTEs are the same.

In FIG. 2B, the illustrated example generally designated by the reference character 210 includes a plurality of page table entries 1–16, 212 and a plurality of physical pages 1–16, 214. The example of FIG. 2B illustrates the method of the preferred embodiment in dividing a larger page into smaller pages.

Assume all physical pages are 4 KB, then all of the PTEs 202 of FIG. 2A map a 64 KB page. For example, when the attributes of PTE 6 change, then the entire area is broken up into four 16 KB segments in example 210 of FIG. 2B. Since all four pages in the first, third and fourth segments have the same attributes, these PTEs 1–4, 9–12, and 13–16 are changed to 16 KB pages. PTEs 1–4, 9–12, and 13–16, 212 map a length equal to four physical pages. PTEs 5–8, 212 map a length equal to one physical page. The PTEs 5–8 in the second 16 KB segment do not have the same attributes so they are broken down further in to 4 KB pages. This results in seven PTEs 212 needed to be loaded into the translation lookaside buffer (TLB) 108 to map the entire 64 KB region including a total of three PTEs for the first, third and fourth segments and four PTEs 212 for the second segment including the 4 K physical pages 5–8, 214.

FIGS. 3A and 3B together illustrate a portion of a page table that spans a region of a buffer generally designated by the reference character 300 including an initial state 302 of the page table and a state 304 after identifying a minimum number of page table entries in accordance with the preferred embodiment. The illustrated page table portion 300 illustrates page table entries (PTEs) including a PTE virtual address (VADDR), PTE physical address (PADDR), and PTE size for a region or range of memory spanning 0x40000 to 0x7FFFF. The first row of the illustrated page table portion 300 depicts the mapping of virtual address 0x40000 to physical address 0x40000 with a size of 16K. Assigning the virtual address to the same physical address is done for illustrative purposes only. In fact, typically the virtual address maps to a completely different physical address.

In the illustrated page table portion 300, initially, the PTE sizes for address ranges 0x40000 to 0xFFFF, 0x50000 to 0x5FFF, and 0x60000 to 0x6FFFF are 16K, 4K, and 64K, respectively. A base page size is defined as the smallest quantum of memory that can be allocated to an application program. That is, any amount less than the base page size is rounded up to a base page size.

Referring also to FIGS. 4A, 4B, 4C, and 4D, there is shown a flow chart illustrating exemplary steps for parsing a page table for a region of memory identified by a virtual address and length in accordance with the preferred embodiment starting at a block 400. The following Table 1 provides pseudo code corresponding to the exemplary steps for parsing a page table for a virtual address and length of FIGS. 4A, 4B, 4C, and 4D.

TABLE 1

ParsePageTable(vaddr, length)

```
{
// Determine aligned beginning of the buffer
buf_bgn = vaddr & ~(BASE_PAGE_SIZE - 1);            line 1
// Lookup the PTE for the beginning of the buffer
pte = LookUpPte(buf_bgn);                            line 2
// Determine start of the range of virtual addresses whose PTEs need to be
// modified
start_vaddr = buf_bgn & ~(pte.page_size - 1);        line 3
// Determine aligned end of the buffer
```

TABLE 1-continued

ParsePageTable(vaddr, length)

```
buf_end = (vaddr + length -1) & ~(BASE_PAGE_SIZE -1);   line 4
// Lookup the PTE for the end of the buffer
pte = LookUpPTE(buf_end);                                line 5
// Determine the end of the range of virtual addresses whose PTEs need to
// be modified
end_vaddr = (buf_end & ~(pte.page.size -1)) + pte.page_size;  line 6
//Adjust the end of the buffer to the next base page entry
buf_end = buf_end + BASE_PAGE_SIZE;                      line 7
for // the range of PTEs to be modified
    (curr_vaddr = start_vaddr;
     curr_vaddr < end_vaddr;
     curr_vaddr = curr_vaddr + size);
    {                                                    line 8
    // Lookup the PTE for the current virtual address
    pte = LookUpPTE(curr_vaddr);                         line 9
    // Determine the largest natural block size for this address
    switch(pte.vaddr)
       case: address aligned on 16 MB boundary: size = 16 MB; break;
       case: address aligned on 4 MB boundary: size =   4 MB; break;
       case: address aligned on 1 MB boundary: size =   1 MB; break;
       case: address aligned on 256 KB boundary: size = 256 KB; break;
       case: address aligned on 64 KB boundary: size =  64 KB; break;
       case: address aligned on 16 KB boundary: size =  16 KB; break;
       case: address aligned on 4 KB boundary: size =    4 kB; break;
       default:           size =BASE_PAGE_SIZE;          line 10
    while // the beginning of the block splits the current natural block
    size OR
       // the end of the block splits the current natural block size.
    ((((pte.vaddr < buf_bgn) && (buf_bgn < pte.vaddr + size)) ||
      ((pte.vaddr < buf_end) && (buf_end < pte.vaddr + size)))
    {                                                    line 11
    // shrink the natural block size to the next smaller natural block
      size
    size = size / NATURAL_BLOCK_SIZE_                    line 12
    MULTIPLIER;
    }
    for // each of the PTEs that comprise the natural block just determined
       // above, adjust its size to the natural block size
       (adjust_vaddr = pte.vaddr;
        adjust_vaddr < pte.vaddr + size;
        adjust_vaddr = adjust_vaddr + BASE_PAGE_SIZE)
    {                                                    line 13
    // Lookup the PTE for the current virtual address
    adjust_pte = LookUpPTE(adjust_vaddr);                line 14
    // Adjust the size of this PTE to the natural block size
    adjust_pte.page_size = size;                         line 15
    // Adjust the physical address to the beginning of the natural block
    adjust_pte.paddr = (pte.paddr + (adjust_pte.vaddr)) & -(size - 1);
    }                                                    line 16
    }
}
```

Assume that a buffer has been requested with a starting address of 0x4A200 for a length of 0x1A000. Also assume for this example that the BASE_PAGE_SIZE is 4K.

As indicated in a block 402 of FIG. 4A and in line 1 of Table 1, first the starting buffer address is rounded or truncated to a BASE_PAGE_SIZE boundary or for this example 0x4A000.

As indicated in a block 404 and in line 2 of Table 1, the base PTE containing the mapping of the virtual to physical address translation for the beginning of the buffer is found. Next in line 3 of Table 1 and as indicated in a block 406, the starting virtual address is determined for the page containing this starting address of the buffer or the natural block containing the starting virtual address is found. In this example, the starting virtual address of the page containing this starting address of the buffer is 0x48000, and is used as the starting range of the entries in the page table that need to be modified.

In line 4 of Table 1 and as indicated in a block 408, the end of the buffer is calculated by adding the starting address to the length of the buffer, and then the result is truncated to a BASE_PAGE_SIZE alignment or 0x62000.

In line 5 of Table 1 and as indicated in a block 410, the base PTE containing the mapping of the virtual to physical address translation for the rounded end buffer address is found. In line 6 and as indicated in a block 412, the natural block containing the ending address is determined, in this example 0x60000, and to the natural block containing the ending address is added the size of this natural block, 64K, resulting in 0x70000, that is used as the ending range of the page table entries (PTEs) in the page table that need to be modified.

In line 7 of Table 1 and as indicated in a block 414 in FIG. 4B, then the end point of the buffer is adjusted to be the next page of the BASE_PAGE_SIZE, or 0x65000. Now with the range of the page table entries having been identified, as indicated in a block 416 and in line 8 of Table 1, loop through the page table and adjust the entries to their natural block boundaries. As indicated in a block 418 and in line 9 of Table 1, the base PTE containing the mapping of the virtual to physical address translation for the current location within the range of PTEs to be modified or the PTE referencing the current virtual address is found.

As indicated in a block 420 in FIG. 4B and line 10 of Table 1, address alignment of the current virtual address is determined and the page size is set equal to alignment to select the largest natural block size for the current value of the virtual address of the PTE. That is, if the pte.vaddr is aligned on a 64K boundary, its natural block size is 64K, if the pte.vaddr is aligned on a 16K boundary, its natural block size is 16K, and the like.

As indicated in a decision block 422 in FIG. 4B and line 11 of Table 1, checking is performed to determine whether the beginning of the buffer is bounded by the page containing the current virtual address. If the natural block currently selected is not split by the start of the buffer, then checking is performed to determine whether the end of the buffer is bounded by the page containing the current virtual address as indicated in a decision block 424 and line 11. This determines if the natural block selected in block 420 and line 10 of Table 1 is divided in two by either the start of the buffer or the end of the buffer. If the natural block currently selected is split by the start or end of the buffer, then the page size is divided by the natural block size multiplier as indicated in a block 426 and in line 12 of table 1. This reduces the natural block size to the next smaller natural block size as depicted in line 12 and block 426. The checks in decision blocks 422 and 424 are repeated to determine if the block size is now correct. The process of reducing the page size continues until the correct page size is determined.

Figure 4C:
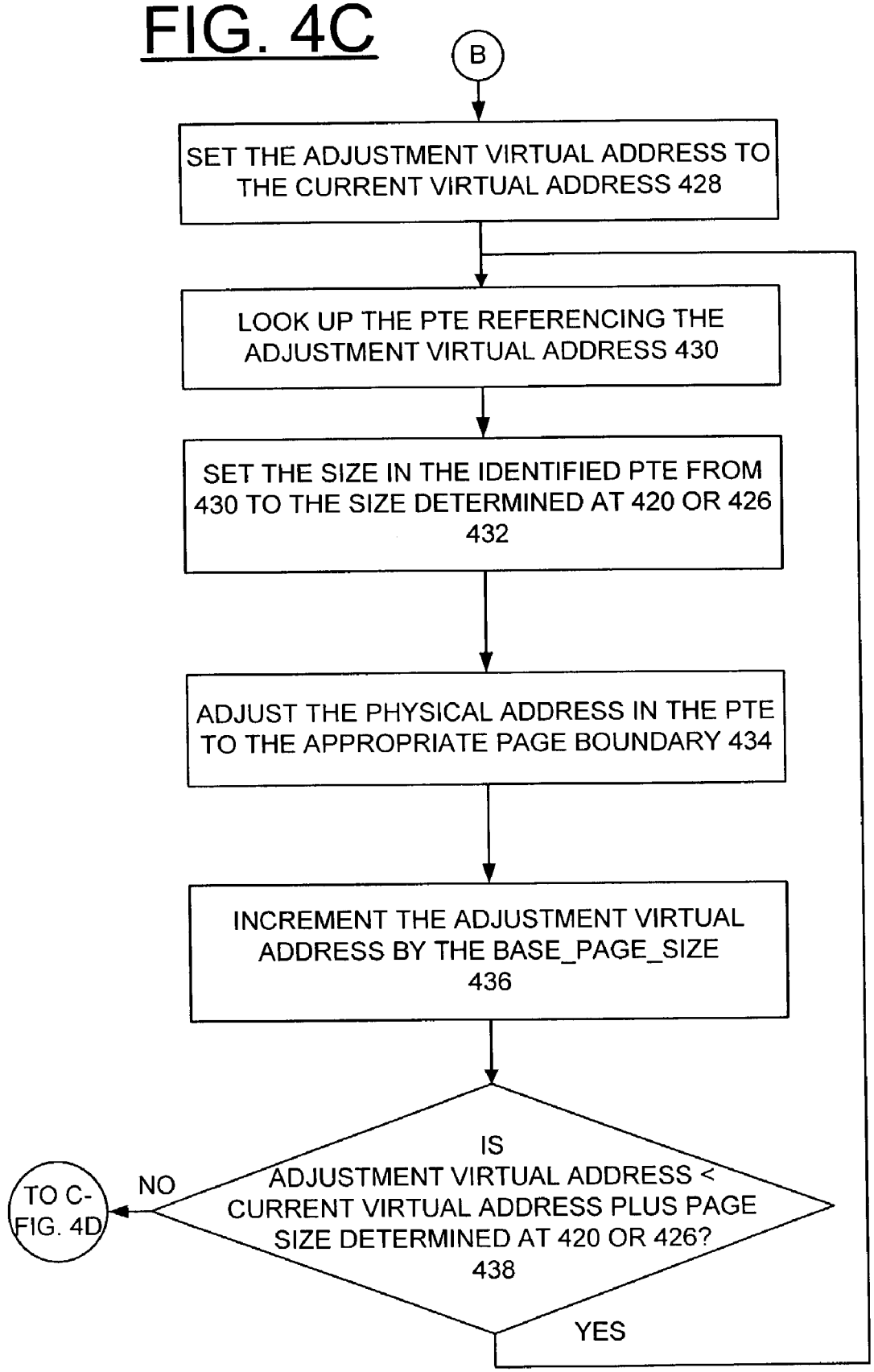

Referring now to FIG. 4C, as indicated in a block 428 and line 13 of Table 1, the adjustment virtual address is set to the current virtual address. The PTE referencing the adjustment virtual address is found as indicated in a block 430 and in line 14 of Table 1. Then looping through the subset of page table entries that comprise the natural block previously identified in lines 11 and 12 of Table 1 is performed as indicated in blocks 422, 424, and 426 of FIG. 4B and to adjust the size of each PTE to the size of the natural block size as depicted in line 15 of Table 1, and as indicated in a block 432 in FIG. 4C.

As indicated in a block 434 and line 16 of Table 1, the physical address in the PTE is adjusted to the appropriate page boundary. In line 16 and block 434 the physical address of the PTE is adjusted to equal to the start of the natural block. If the size of the natural block is 4K, the physical address of the PTE is aligned on a 4K boundary. Likewise if the size of the natural block is 16K, the physical address of the PTE is aligned on a 16K boundary, and so on, up to the maximum natural block size aligned on the maximum natural block size boundary.

Next the adjustment virtual address is incremented by the BASE_PAGE_SIZE as indicated in a block 436 and line 13 of Table 1. Next checking is performed to determine whether the adjustment virtual address is less than the current virtual address plus the page size determined at block 420 or block 426 as indicated in a decision block 438 and line 13 of table 1. If the adjustment virtual address is less than the current virtual address plus the page sized determined at block 420 or block 426, then the sequential steps return to block 430 and are repeated.

Figure 4D:
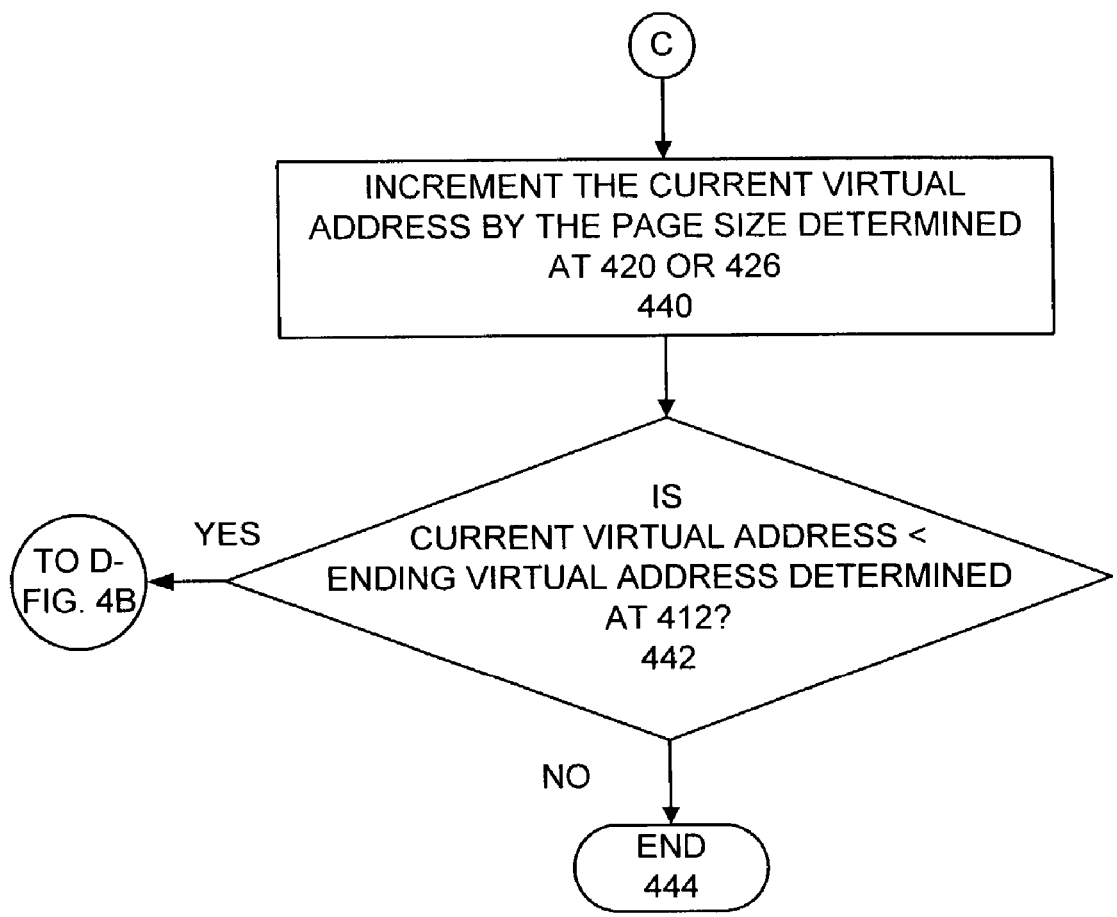

If not, then the current virtual address is incremented by the page size determined at block 420 or block 426 as indicated in a block 440 in FIG. 4D and in line 8 of table 1. Then checking whether the current virtual address is less than the ending virtual address determined at block 412 in FIG. 4A is performed as indicated in a decision block 442 and in line 8 of table 1. If not, then the sequential steps end as indicated in a block 444. Otherwise when the current virtual address is less than the ending virtual address determined at block 412 in FIG. 4A, then the sequential steps return to block 418 in FIG. 4A and are repeated.

Figure 5A:
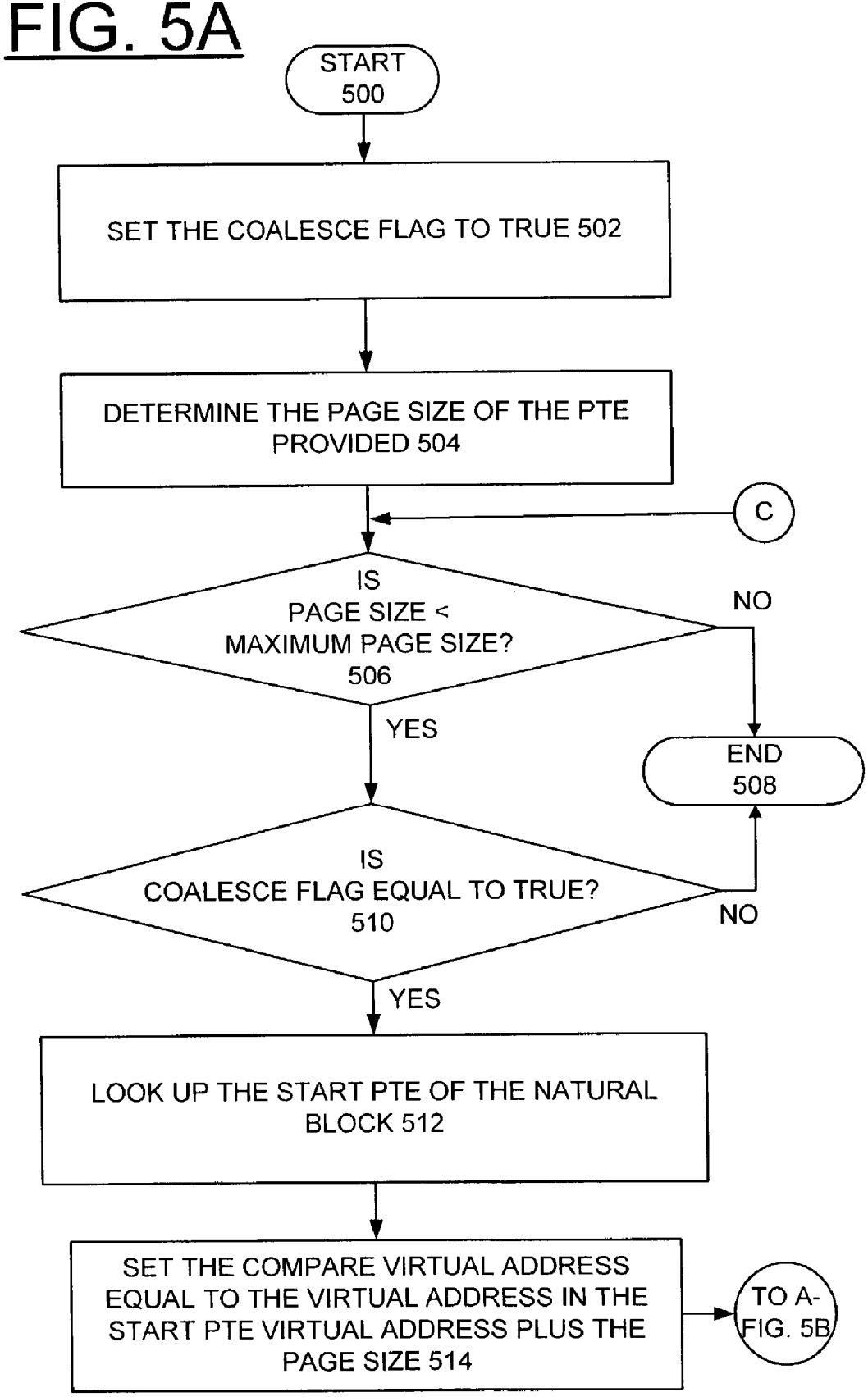

Referring now FIGS. 5A, 5B, and 5C there is shown a flow diagram illustrating exemplary steps for coalescing page table entries in accordance with the preferred embodiment starting at a block 500.

Referring also to FIGS. 6A and 6B, there is shown an exemplary portion of a page table that spans a region of a buffer generally designated by the reference character 600 including an initial state 602 of the page table and a state 604 after coalescing page table entries in accordance with the preferred embodiment. The illustrated page table portion 600 illustrates page table entries (PTEs) including a PTE virtual address (VADDR), PTE physical address (PADDR), PTE size and PTE ATTRs (PTE attributes) for a region or range of memory spanning 0x40000 to 0x7FFFF. The illustrated PTE ATTRs includes NWP (non-write protect) and WP (write protect). The first row of the illustrated page table portion 600 depicts the mapping of virtual address 0x40000 to physical address 0x40000 with a size of 16K.

In the illustrated page table portion 600 in FIG. 6B, initially, the PTE sizes for address ranges 0x40000 to 0x47000, 0x48000 to 0x4B000, 0x4C000 to 0x4F000, 0x50000 to 0x5FFFF are 16K, 4K, 16K and 64K, respectively. A buf_bgn address of 0x40000 and a buf_end address of 0x49000 is shown with sizes of 16KB and 4KB.

The following Table 2 provides pseudo code corresponding to exemplary steps for coalescing page table entries the flow chart of FIGS. 5A, 5B, and 5C.

TABLE 2

CoalescePageTable (pte)

```
// Initialize the initial state of the coalesce flag to TRUE.
coalesce = TRUE                                              line 1
// Set the starting page size to work with to the page size of the
// PTE where the coalescing is to start.
page_size = pte.page_size;                                   line 2
// Attempt to coalesce PTEs while the MAX_PAGE_SIZE has not been
// reached AND the attempt to coalesce at a smaller page size
// is successful.
while ((page_size < MAX_PAGE_SIZE) &&
       (coalesce == TRUE))
    {                                                        line 3
```

TABLE 2-continued

CoalescePageTable (pte)

```
// Look up the first PTE in the natural block. This is the PTE
// that the remaining PTEs contained within the same natural block
// are compared to below.
start_pte = LookUpPTE(pte.vaddr & ~(page_size - 1));         line 4
for // each of the PTEs that comprise the natural block just
    // determined above, adjust its size to the natural block size
    (cmp_vaddr = start_pte.vaddr + page size;
     cmp_vaddr < starte_pte.vaddr + (page_size +
                          NATURAL_BLOCK_SIZE_MULTIPLIER
     cmp_vaddr = cmp_vaddr + page size)
    {                                                        line 5
    // Look up the PTE to compare to
    cmp_pte = LookUpPTE(cmp_vaddr);                          line 6
    if // If the page sizes of the PTEs do not match OR
       // the physical addresses mapped by the PTEs ARE NOT
       // contiguous OR the attributes of the PTEs do not match.
       (start_pte.page._size ! = cmp_pte.page_size) ||
       (start_pte.paddr ! =
         (cmp_pte.paddr - (cmp_pte.vaddr - start_pte.vaddr))) ||
       (start_pte.attributes ! = cmp_pte.attributes))
    {                                                        line 7
    // Indicates that these PTEs cannot be coalesced.
    coalesce = FALSE;                                        line 8
    // Break out of the for loop, since no further coalescing
    // can be accomplished.
    break;
    }
    }                                                        line 9
if // If all PTEs in the new natural block meet the requirement.
   (coalesce = TRUE)
{                                                            line 10
// Increment the page size to the next supported page size.
page_size = page_size * NATURAL_BLOCK_SIZE_            line 11
MULTIPLIER;
for // each of the PTEs that comprise the natural block just
    // determined above, adjust its size to the natural
    // block size
    (adjust_vaddr = start)pte.vaddr;
    adjust_vaddr < start_pte.vaddr + page_size;
    adjust_vaddr = adjust_vaddr + BASE_PAGE_SIZE)
    {                                                        line 12
    // Look up the next PTE to be updated in the natural block.
    adjust_pte = LookUpPTE(adjust_vaddr);                    line 13
    // Set the page size of the PTE to the new page size.
    adjust_pte.page_size = page_size;                        line 14
    // Set the physical address of the PTE to the physical address
    // of the first physical page in the natural block.
    adjust_pte.paddr = start_pte.paddr;                      line 15
    }
    }
 }
}
```

Table 2, FIGS. 5A, 5B, 5C; and FIGS. 6A and 6B build on the example of FIGS. 3A and 3B. A pointer to the PTE which references the last page of the buffer is provided to the CoalescePageTable algorithm. As indicated in a block 502 and line 1 of Table 2, a flag indicating coalescing is possible is initialized to true. As indicated in a block 504 and line 2 of Table 2, the page size represented by the provided PTE is determined. In this example 600 of FIGS. 6A and 6B, the page size is initially 4 KB.

Next the conditions of looking for pages to coalesce are determined as indicated in a decision block 510 and line 3 in Table 2. Pages can be coalesced up to a predetermined maximum size and once it is determined that a page can not be coalesced with a neighbor, no additional coalescing is attempted. The sequential steps end as indicated in a block 508 when the page size not less than the maximum page size. As indicated in a decision block 516 and line 5 of Table 2, the virtual addresses referenced by the PTEs that need to be compared with the start_pte are determined in the loop of line 5. Because identical PTEs are used to map pages larger than the BASE_PAGE_SIZE, not every PTE needs to be compared, just PTEs falling on the page_size boundary. Since only the page_size boundaries are being checked the total number of PTEs to check, including the start_pte, is always equal to the NATURAL_BLOCK_SIZE_MULTIPLIER. This determines how many like pages are required to coalesce into the next large natural block size. The NATURAL_BLOCK_SIZE_MULTIPLIER is determined by the increment size between possible page sizes. The NATURAL_BLOCK_SIZE_MULTIPLIER in this example is 4, that is, the possible page sizes are 4 KB, 16 KB, 64 KB, 256 KB, and the like. The first PTE that the provided PTE could be grouped with to form a larger natural block is determined as indicated in a decision block 512 and line 4 of Table 2. In this case the start_pte would be the PTE with vaddr 00048000. Then the compare virtual address is set equal to the virtual address in the start PTE virtual address plus the page size as indicated in a block 514.

Referring to FIG. 5B, checking is performed to determine if the compare virtual address is less than the start PTE virtual address plus the page size multiplied by the NATURAL_BLOCK_SIZE_MULTIPLIER as indicated in a decision block 516. If not then the sequential steps continue following entry point B in FIG. 5C. Otherwise then as indicated in a block 518 and line 6 of Table 2, the PTE referencing the compare virtual address is found. For the very first pass through the loop this would be the PTEs referencing virtual addresses 00049000, 0004A000, and 0004B000. In a subsequent loop the start_pte would point to the PTE mapping virtual address 00040000 and the PTEs being compared would map virtual addresses 00044000, 00048000, and 0004C000.

Next as indicated in a decision block 520 and line 7 of Table 2, the PTEs are checked to determine if they can be combined. All of the compared PTEs must have the same page size, map contiguous physical addresses, and have the same attributes, for example write protection, cacheability, as the start_pte. In the third pass of the loop at line 4 of Table 2, this check will fail because the size of the virtual page at 00040000 does not match that of the virtual page 006000.

If the conditions of line 7 and decision blocks 520, 522 and 524 are not met, then the coalesce flag is set to false as indicated in a block 526 and in line 8 of Table 2. If the coalesce flag is set to false at block 526 and in line 8 of Table 2, then line 9 of Table 2 will break out of the loop at line 5 since there is no reason to continue the compare process.

Once the loop in line 5 and blocks 514, 516, 528 completes, a check is made in line 10 and as indicated in a block 530 in FIG. 5C to determine if coalescing is still possible. If not, then the sequential steps return to decision block 506 in FIG. 5A. If coalescing is still possible, then the page size is increased by the NATURAL_BLOCK_SIZE_MULTIPLIER as indicated in a block 532 in FIG. 5C and line 11 of Table 2. For the first pass through this loop the page size would be increased from 4 KB to 16 KB. The second pass through this loop the page size would be increased from 16 KB to 64 KB. As indicated in blocks 534, and 536, line 12 of Table 2 walks through each of the PTEs referencing the virtual addresses, incremented by the BASE_PAGE_SIZE, in the range from the start_pte.vaddr to start_pte.vaddr plus the size of the new page calculate in line 11 and at block 532. In the first pass of the loop in line 5, this range would be 00048000 through 0004BFFF. In the second pass of the line 5 loop, this range would be 00040000 through 0004FFFF. The PTE referencing the virtual address which needs to be adjusted is found as indicated in a block 538 and line 13 of Table 2. The PTEs page size is updated to the new page size as indicated in a block 540 and line 14 of Table 2. For the initial pass through the loop started in line 4 and block 512 in FIG. 5A, this page size will be 16 KB. For the second pass, this page size will be 64 KB.

As indicated in a block 542 and line 15 of Table 2, the physical address the PTE references is updated to the start PTEs physical address. For the initial pass through the loop started in line 4 and block 512, this physical page address will be 00048000. For the second pass, this physical page address will be 00040000. As indicated in a block 544 and line 12 of Table 2, the adjustment virtual address is incremented by the PAGE_TABLE_SIZE. Then the sequential steps return to block 536 and continue.

It should be understood that those skilled in the art would recognize that lines 10 through 15 of Table 2, and corresponding blocks 530, 532, 534, 536, 538, 540, and 542, could be placed outside of the loop at line 4 with minor modifications to the loop starting at line 5. Lines 10 through 15 of Table 2 were left inside the line 4 loop for the purpose to make the workings of the algorithm more easily understood.

Likewise, the second invocation of CoalescePageTable provides a pointer to the PTE which references the first page of the buffer. Then no coalescing will occur in this case because the page sizes of the PTEs referencing virtual address 0004000 and 00060000 do not match.

Referring now to FIG. 7, there is shown a flow diagram illustrating exemplary steps of a select order algorighm in accordance with the preferred embodiment starting at a block 700. The following Table 3 SelectOrder(vaddr, length) provides pseudo code illustrating exemplary steps for coalescing page table entries corresponding to the flow chart of FIG. 7. In Table 3, an additional buffer has been allocated in the address range of 00040000 to 00049FFF. The algorithm of Table 3 is applied to the PTEs referencing the first and last pages of the newly allocated buffer to determine if the PTEs can be coalesced with any neighboring PTEs. The algorithm of Table 3 drives the algorithm in Table 2 described above.

TABLE 3

```
SelectOrder(vaddr, length)
(
// Look up the PTE referencing the first page of the provided buffer.
start_pte = LookUpPTE(vaddr);                                    line 1
// Look up the PTE referencing the last page of the provided buffer.
end_pte = LookUpPTE(vaddr + length);                             line 2
if // The page size of the start PTE is equal or smaller than the
   // end PTE.
   (start_pte.page_size <= end_pte.page_size)
   (                                                             line 3
   // Coalesce at the start_pte first.
   smaller_page_pte = end_pte;                                   line 4
   // Coalesce at the end_pte second.
   larger_page_pte = end_pte;                                    line 5
   )
else
   (
   // Coalesce at the end_pte first.
   smaller_page_pte = end_pte;                                   line 6
   // Coalesce at the start_pte second.
   larger_page_pte = end_pte;                                    line 7
   )
// Coalesce the smaller page
CoalescePageTable(smaller_page_pte);                             line 8
// Coalesce the larger page
CoalescePageTable(larger_page_pte);                              line 9
)
```

As indicated in a block 702 in FIG. 7 and line 1 of Table 3, first the Select Order Algorithm determines the PTE referencing the first page of the buffer. As indicated in a block 704 and line 2 of Table 3, next the PTE referencing the last page of the buffer is found. As indicated in a decision block 706 and line 3 of Table 3, it is determined which of the first or last page of the buffer is the smaller of the two. The PTE using smaller pages must be coalesced first so if possible it can be coalesced into a page of the same or greater size as the larger. This is done for cases where the start and end PTEs can be coalesced with neighboring PTEs first and then with each other later.

As indicated in a block 708 and lines 4 and 5 of Table 3, the smaller page PTE is set to the start PTE in line 5 if it is smaller and the larger PTE is set to the end PTE in line 5.

As indicated in a block 710 and lines 6 and 7 of Table 3, if the end PTE is the smaller page PTE of the two, then the smaller PTE is set to the end PTE in line 6 and the larger PTE is set to the start PTE in line 7.

As indicated in a block 712, the CoalescePageTable algorithm is called and provided with the smaller_page_pte in line 8 of Table 3. As indicated in a block 714, the CoalescePageTable algorithm is called and provided with the larger_page_pte in line 9 of Table 3. The sequential steps end as indicated in a block 716.

In brief summary, the methods of the preferred embodiment work with any region of memory, any starting address and any length. The methods of the preferred embodiment take fragmented memory and coalesce the memory into larger sizes. The methods of the preferred embodiment take a large region of memory and subdivide the region into the minimum number of natural blocks that comprise the larger region.

Referring now to FIG. 8, an article of manufacture or a computer program product 800 of the invention is illustrated. The computer program product 800 includes a recording medium 802, such as, a floppy disk, a high capacity read only memory in the form of an optically read compact disk or CD-ROM, a tape, a transmission type media such as a digital or analog communications link, or a similar computer program product. Recording medium 802 stores program means 804, 806, 808, 810 on the medium 802 for carrying out the methods for dynamically minimizing translation lookaside buffer (TLB) entries across contiguous memory of the preferred embodiment in the system 100 of FIG. 1.

A sequence of program instructions or a logical assembly of one or more interrelated modules defined by the recorded program means 804, 806, 808, 810, direct the processor system 100 for dynamically minimizing translation lookaside buffer (TLB) entries across contiguous memory of the preferred embodiment.

While the present invention has been described with reference to the details of the embodiments of the invention shown in the drawing, these details are not intended to limit the scope of the invention as claimed in the appended claims.

What is claimed is:

1. A method for dynamically minimizing translation lookaside buffer (TLB) entries across contiguous memory comprising the steps of:
    providing a page table with page table entries (PTEs) for mapping multiple sized pages from a virtual address space to a physical address space, each of said multiple sized pages being a multiple of a base page size;
    for a region of contiguous memory having a virtual address and length, dividing said memory region into a minimum number of largest natural blocks based upon alignment and size for said memory region including truncating said virtual address to a base page size boundary for identifying a buffer beginning virtual address for said memory region; and identifying a base PTE for the identified buffer beginning virtual address;
    assigning PTEs to map said natural blocks; multiple identical PTEs being assigned for each of said natural blocks greater than said base page size; and
    using one TLB entry to map each of said largest natural blocks.

2. A method for dynamically minimizing translation lookaside buffer (TLB) entries across contiguous memory as recited in claim 1 further includes steps of adding said length to said virtual address and truncating said resulting virtual address to identify a buffer end virtual address; and identifying a base PTE for the identified buffer end virtual address.

3. A method for dynamically minimizing translation lookaside buffer (TLB) entries across contiguous memory as recited in claim 2 further includes steps of identifying a natural block containing said buffer end virtual address and adding a size of said identified natural block to identify an ending range of PTEs to be modified.

4. A method for dynamically minimizing translation lookaside buffer (TLB) entries across contiguous memory as recited in claim 1 includes steps of identifying a range of PTEs to be modified, looping though said page table and adjusting each of said PTEs to be modified to a respective natural block boundary.

5. A method for dynamically minimizing translation lookaside buffer (TLB) entries across contiguous memory as recited in claim 4 includes steps of setting a current virtual address to said identified buffer beginning virtual address, identifying a PTE referencing said current virtual address, determining address alignment for said current virtual address and setting a page size equal to said address alignment to select a largest natural block size for said PTE referencing said current virtual address.

6. A method for dynamically minimizing translation lookaside buffer (TLB) entries across contiguous memory as recited in claim 5 includes a step of determining if said selected largest natural block size is split by either said buffer beginning virtual address or said buffer end virtual address.

7. A method for dynamically minimizing translation lookaside buffer (TLB) entries across contiguous memory as recited in claim 6 includes a step of selecting a next smaller natural block size when said selected largest natural block size is split by either said buffer beginning virtual address or said buffer end virtual address.

8. A method for dynamically minimizing translation lookaside buffer (TLB) entries across contiguous memory as recited in claim 6 includes steps of setting an adjustment virtual address to said current virtual address, identifying a PTE referencing said current virtual address, setting said selected natural block size for said PTE referencing said current virtual address; aligning a physical address of the PTE to said selected natural block boundary; and incrementing said adjustment virtual address by said base page size.

9. A method for dynamically minimizing translation lookaside buffer (TLB) entries across contiguous memory as recited in claim 8 includes steps of checking if said adjustment virtual address is less than said current virtual address plus said selected natural block size; and when said adjustment virtual address is less than said current virtual address plus said selected natural block size, setting said adjustment virtual address to said current virtual address, identifying a PTE referencing said current virtual address, setting said selected natural block size for said PTE referencing said current virtual address; aligning said physical address of said PTE to said selected natural block boundary; and incrementing said adjustment virtual address by said base page size.

10. A method for dynamically minimizing translation lookaside buffer (TLB) entries across contiguous memory as recited in claim 9 further includes steps of incrementing said current virtual address by said selected natural block size when said adjustment virtual address is not less than said current virtual address plus said selected natural block size; and comparing said current virtual address to said buffer end virtual address.

11. A method for dynamically minimizing translation lookaside buffer (TLB) entries across contiguous memory as recited in claim 9 further includes steps responsive to said current virtual address being less than said buffer end virtual address, of identifying said PTE referencing said current virtual address, determining address alignment of said current virtual address and setting a page size equal to said address alignment to select a largest natural block size for said PTE referencing said current virtual address.

12. A method for dynamically minimizing translation lookaside buffer (TLB) entries across contiguous memory as recited in claim 1 further includes a step of coalescing multiple first PTEs into a second PTE, said second PTE having a larger page size than said first PTEs.

13. A method for dynamically minimizing translation lookaside buffer (TLB) entries across contiguous memory as recited in claim 12 includes steps of identifying a page size for an identified start PTE of said first PTEs, setting a compare virtual address equal to a virtual address of said start PTE plus said identified page size, checking if said compare virtual address is less than said start PTE virtual address plus said identified page size multiplied by a natural block size multiplier; and responsive to said compare virtual address being less than said start PTE virtual address plus said identified page size multiplied by a natural block size multiplier, incrementing said compare virtual address by said identified page size.

14. A method for dynamically minimizing translation lookaside buffer (TLB) entries across contiguous memory as recited in claim 13 includes steps of identifying a compare PTE referencing said compare virtual address, and checking whether said identified start PTE and said compare PTE can be combined.

15. A method for dynamically minimizing translation lookaside buffer (TLB) entries across contiguous memory as recited in claim 14 wherein the step of checking whether said identified start PTE and said compare PTE can be combined includes steps of checking for a matching page size of said start PTE and said compare PTE; checking if a respective physical address of said start PTE and said compare PTE are contiguous; and checking for matching attributes of said start PTE and said compare PTE.

16. A computer program product for dynamically minimizing translation lookaside buffer (TLB) entries across contiguous memory in a processor system, said computer program product including a plurality of computer executable instructions stored on a computer readable medium, wherein said instructions, when executed by the processor system, cause the processor system to perform the steps of:

providing a page table with page table entries (PTEs) for mapping multiple sized pages from a virtual address space to a physical address space, each of said multiple sized pages being a natural block size multiple of a base page size;

for a region of contiguous memory having a virtual address and length, dividing said memory region into a minimum number of largest natural blocks based upon alignment and size for said memory region;

assigning PTEs to map said natural blocks; multiple identical PTEs being assigned for each of said natural blocks greater than said base page size;

using one TLB entry to map each of said largest natural blocks; and coalescing multiple first PTEs into a second PTE including identifying a matching page size for said first PTEs; identifying matching attributes for said first PTEs; said second PTE having a larger page size than said first PTEs.

17. Apparatus for dynamically minimizing translation lookaside buffer (TLB) entries across contiguous memory comprising:

a page table with page table entries (PTEs) for mapping multiple sized pages from a virtual address space to a physical address space, each of said multiple sized pages being a multiple of a base page size;

a memory management program performing the steps of dividing a memory region into a minimum number of largest natural blocks based upon alignment and size for said memory region;

assigning PTEs to map said natural blocks; multiple identical PTEs being assigned for each of said natural blocks greater than said base page size;

using one TLB entry to map each of said largest natural blocks; and coalescing multiple first PTEs into a second PTE including identifying a matching page size for said first PTEs; identifying matching attributes for said first PTEs; said second PTE having a larger page size than said first PTEs.

* * * * *